Dec. 28, 1965  G. G. LAMPKE  3,226,630
POWER SUPPLY REGULATORS
Filed March 1, 1963  2 Sheets-Sheet 1

INVENTOR.
GEORGE G. LAMPKE
BY Robert T. Dunn
AGENT

INVENTOR.
GEORGE G. LAMPKE
BY Robert T Dunn
AGENT

United States Patent Office 3,226,630
Patented Dec. 28, 1965

3,226,630
POWER SUPPLY REGULATORS
George G. Lampke, Framingham, Mass., assignor to Raytheon Company, Lexington, Mass., a corporation of Delaware
Filed Mar. 1, 1963, Ser. No. 262,038
3 Claims. (Cl. 323—66)

This invention relates to voltage regulators, and more particularly to a regulator in which fluctuating D.C. voltage is first chopped at a frequency substantially higher than the fluctuating frequency and then filtered to provide a load with substantially steady D.C voltage.

Heretofore, voltage regulators have been employed which convert fluctuating or raw D.C. voltage to substantially steady D.C. voltage by first chopping the fluctuating D.C. at a frequency substantially higher than the fluctuating frequency and then feeding the chopped voltage into an LC filter which heavily filters the chopping frequency. The output of the filter is applied to a load and also provides a feedback voltage which is compared with a reference voltage to provide a signal for controlling the chopping frequency or duty cycle. If the fluctuating or raw D.C. is derived from a 60 cycle source and is full wave rectified, 120 cycle ripple will be present. Since the chopping frequency is filtered very heavily by the LC filter substantial phase shift is introduced in the 120 cycle ripple frequency, and this phase shift greatly reduces the ability of the regulator to control the chopping as necessary to compensate for the 120 cycle ripple. It is one object of the present invention to avoid the above problem with ripple phase shift in a voltage regulator system which chops raw D.C. to compensate for the ripple.

It is another object of the present invention to avoid the use of large filtering chokes and capacitors in the output of the regulator such as required in the past to filter the chopping frequency heavily and at the same time pass ripple frequency.

It is a feature of the present invention to feed back the chopped voltage before it is averaged in the LC filter and to integrate this feedback and compare the results with a reference voltage producing a signal for controlling the chopper duty cycle. As a result, the ripple is eliminated before the D.C. is filtered, and so the filter need only smooth the chopper frequency. In the present invention, the output from the LC filter which is applied to the load is employed only to modify the reference voltage by compensating for losses in the filter which vary as the load uses more or less power and, thus, the reference remains substantially fixed while the power to the load is fixed.

Principles of the present invention are embodied in a circuit including a power switch for interrupting the unregulated D.C. at the chopping frequency rate, an LC filter for smoothing chopper frequency in the output, a circuit for intergrating the voltage output from the chopper switch, and comparing the result with a reference signal producing a signal for altering the chopper switch duty cycle. In this circuit ripple in the raw D.C. is cancelled before power reaches the LC filter, and so the filter need only smooth the chopping frequency and can be designed without particular consideration of the ripple frequency.

In the embodiment described, the duty cycle of the chopping signal is varied to compensate for the ripple; however, it should be clearly understood that both duty cycle and chopping frequency could be varied or only frequency could be varied to accomplish the same result. The applicant has found that it is particularly convenient to vary the duty cycle, as this permits the use of stable conventional circuitry. For example, an astable multivibrator is employed driving a bistable flip-flop circuit. The multivibrator provides clock pulses which set the flip-flop, and the output of the flip-flop drives the chopper switch via a switch driver circuit. The integrating circuit integrates the output of the switch when it is on and resets automatically when the switch is off. When the integrated signal is equal to the reference signal a pulse is generated which resets the flip-flop. This cycle is then repeated after the multivibrator again sets the flip-flop. Thus, the duty cycle of the fixed pulse frequency rate for multivibrator is varied as necessary to compensate for the ripple in the unregulated D.C. power voltage.

Other features and objects of the invention will be apparent from the following specific description taken in conjunction with the drawings in which.

Figure 1:
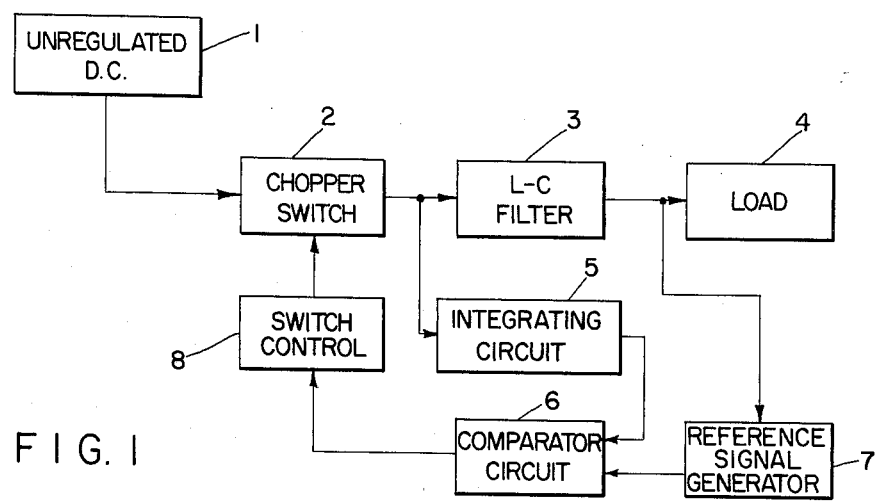
FIG. 1 is a block diagram showing principal parts of a voltage regulating circuit incorporating features of the invention.

FIG. 1 illustrates principal features of the invention in a block diagram. A source of unregulated D.C. power 1 is fed through a chopper switch 2 to an LC filter 3 and then to a load 4. The chopper switch interrupts the power at regular or substantially regular intervals, thus imposing a chopper frequency on the unregulated D.C. The LC filter serves to smooth the chopper frequency substantially eliminating it from the power supply to the load. The chopped signal from the switch 2 is also integrated by integrating circuit 5 and applied to a comparator circuit 6. The voltage output from the LC filter 3 is converted to a reference signal by reference signal generator 7, and this reference signal is compared with the output of the integrating circuit 5. The reference signal thus generated remains substantially constant so long as the load 4 continues to use a substantially constant amount of power, and thus the integrated output from the chopper switch 2 is compared with a substantially fixed reference signal. As a result of this comparison, a control signal is produced for controlling the chopper switch, control 8 which, in turn, drives the chopper switch 2. This control signal may be supplied to control 8 to vary the duty cycle and/or pulse frequency rate of the chopper signal which drives the chopper switch 2. For example, if the pulse frequency rate of the chopper signal is fixed, then the duty cycle is varied depending upon how quickly the integrated output from the switch reaches the value of the reference signal. The integrated output of the chopper switch will vary for each chopping cycle depending upon where in a ripple cycle the chopping cycle occurs. If it occurs at a peak excursion of the ripple cycle, the integrated output will most quickly become equal to the reference signal, and the duration the chopper switch is closed will be at a minimum. This is illustrated by the two waveform diagrams A and B shown in FIG. 2. Waveform A represents the unregulated D.C. showing a cycle of ripple frequency, and waveform B shows the chopper signal or periods during which the chopper switch is closed. The duty cycle of the chopper signal varies over each half cycle of the ripple frequency and becomes largest at the lowest excursions of the ripple frequency and smallest at the highest excursions of the ripple frequency. Thus, when these two waveforms A and B are added a substantially steady voltage is produced, containing fluctuations only at the chopper frequency which can be readily filtered.

Figure 2:
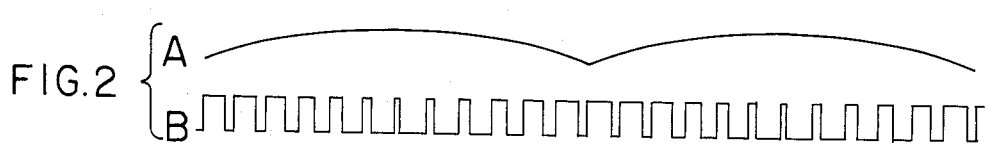
FIG. 2 illustrates the nature of the ripple on the unregulated D.C. and the nature of the chopping signal.
Figure 3:
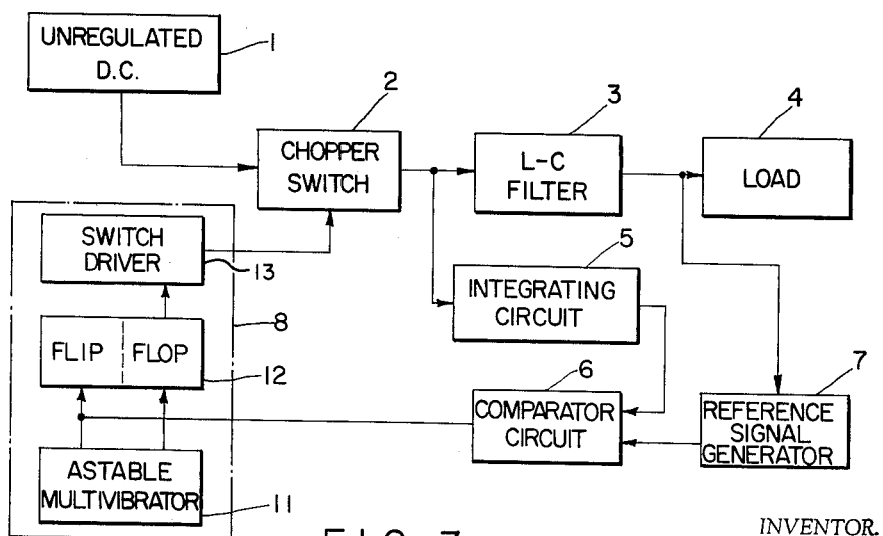
FIG. 3 is a block diagram similar to the diagram in FIG. 1 and including an astable multivibrator and bistable multivibrator or flip-flop circuit for controlling the chopper switch.

FIG. 3 illustrates another block diagram showing features of the invention and particularly showing means for generating a chopper signal of the type shown in waveform B of FIG. 2 in which pulse frequency rate is fixed but duty cycle is varied to compensate for the ripple. All the elements in FIG. 3 are substantially the same as elements in FIG. 1 except for the chopper switch control 8. In FIG. 3 this control is replaced by an astable multivibrator 11 which drives a bistable flip-flop circuit 12. A single output from the flip-flop is applied to switch driver circuit 13 which controls the chopper switch 2. In operation alternate pulses from the multivibrator turn one stage of the flip-flop circuit on and the other alternate pulses turn the other stage one. The first stage controls the chopper switch via the switch driver, and thus initiates a closure of the chopper switch commencing the integration of the switch output. When the integral equals the reference, a pulse is produced in the output of the comparing circuit, and this pulse resets the flip-flop turning the other stage on. Thus, the duty cycle of each pulse applied to the switch from the first stage of the flip-flop circuit depends upon the integrated voltage output from the power switch 2. When there is ripple in this voltage, the duty cycle of pulses from the flip-flop continually changes in synchronism therewith to compensate for the ripple.

Figure 4:
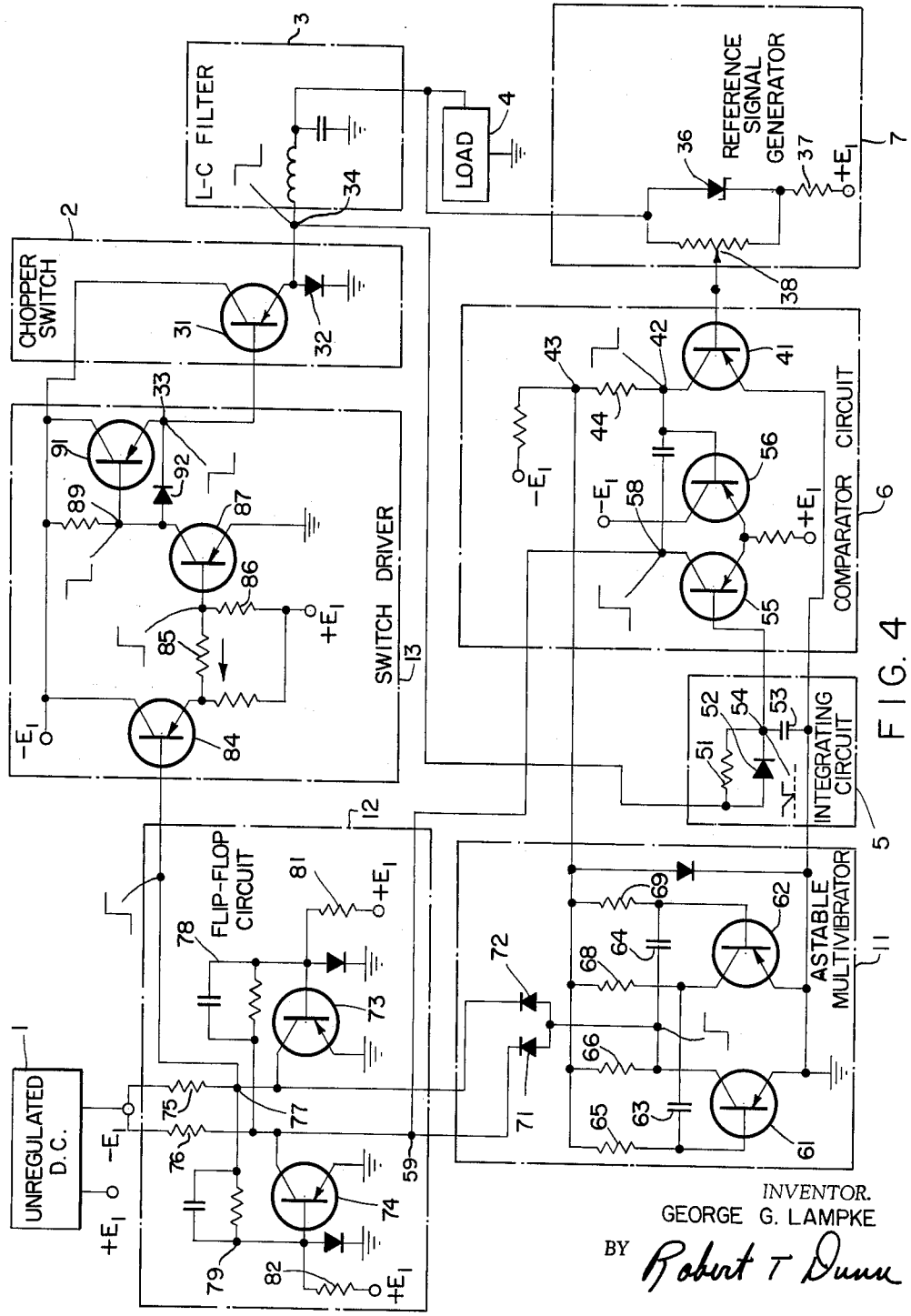
FIG. 4 illustrates details of the circuit components of the block diagram shown in FIG. 3.

FIG. 4 illustrates circuit details of the various elements shown in FIG. 3. As shown in FIG. 4, the source of regulated D.C. provides two unregulated voltages $+E_1$ and $-E_1$ which are equal in absolute magnitude but of opposite polarity. One of these, for example, $-E_1$, is supplied to the chopper switch 2 which includes a PNP transistor 31 connected with its emitter grounded through a diode 32. When the transistor 31 is not conducting, the emitter and base are both substantially at or near ground potential. However, when terminal 33 is caused to swing negative by a pulse, derived from the flip-flop circuit 12, this base will swing negative, the transistor 31 will conduct and terminal 34 at the input to the LC filter 3 will also swing negative to voltage $-E_1$.

The regulated voltage from filter 3 and $+E_1$ from the source serve to generate the reference signal. These voltages are applied across the series combination of zener diode 36 and resistor 37 in reference generator 7. The reverse characteristics of the diode are such that the diode maintains constant voltage across potentiometer 38 which is in parallel with the diode, even though the D.C. level of the source should change. Thus, potentiometer 38 provides an adjustable reference voltage to the base of amplifying transistor 41 in the comparator circuit, and the collector of transistor 41 provides a reference voltage level at terminals 42 and 43 across resistor 44 for comparison with the integrated output from the chopper switch.

Meanwhile, the voltage at the output of the chopper switch 2 on terminal 34 is integrated by integrating circuit 5 which includes a resistor 51 for charging and diode 52 for discharging capacitance 53. Thus, the voltage at terminal 54 of this capacitor is representative of the integral of the voltage output from the power switch 2. The comparing circuit 6 serves to compare the voltages at terminals 54 and 42 generating a pulse when they are equal. This pulse is fed to the flip-flop circuit 12 resetting it and causing switch transistor 31 to stop conducting. This comparison is accomplished by transistors 55 and 56 which have their bases coupled to terminals 54 and 42, respectively.

Normally transistor 56 is conducting, but transistor 55 is not. When the integrated output of the chopper switch, represented by the voltage at terminal 54, equals the reference voltage at terminal 42, transistor 55 will conduct sharply producing a sharp voltage rise or pulse at terminal 58. This pulse is fed to terminal 59 of the flip-flop circuit 12 and resets the flip-flop. When the flip-flop resets, chopper switch 2 opens; the voltage at terminal 34 rises to ground; capacitance 53 discharges through diode 52, and transistor 55 ceases conducting; thus, terminating the pulse output from the comparator circuit 6.

The flip-flop circuit 12 is driven by astable multivibrator 11 which is of standard construction including two transistors 61 and 62 with grounded emitters. The bases and collectors of transistors 61 and 62 are interconnected by capacitances 63 and 64, and both bases and collectors connect to terminal 43 via suitable resistors 65, 66, 68, and 69. In operation, as one of the transistors, for example, 62 increases conduction, the other 61 will decrease conduction, and vice versa. The conduction reverses from one of these transistors to the other, and so the circuit oscillates producing a substantially steady rate of pulses to output diodes 71 and 72.

Each successive pulse applied to diodes 71 and 72 causes a reversal in flip-flop circuit 12 which is manifest when one of the transistors 73 and 74 in the flip-flop circuit commences to conduct more than the other. For example, during the interval when the switch 2 is closed and the voltage at terminal 34 is substantially $-E_1$, transistor 73 will be conducting and transistor 74 will be substantially nonconducting. As a result, current will be drawn by resistor 75 which connects to the collector of transistor 73, while substantially no current will be drawn by resistor 76 which connects to the collector of transistor 74. As a result, the voltage at terminal 77 will have increased to the vicinity of ground potential and will remain substantially at ground until the positive-going pulse is produced at terminal 58 in the comparator circuit 6. The pulse from terminal 58 is applied to the base of transistor 73 via RC circuit 78 and turns off transistor 73. When transistor 73 turns off (ceases conducting) terminal 77 swings negative providing a negative pulse, via RC circuit 79, to the base of transistor 74 causing transistor 74 to conduct. The diode-resistor combinations 81 and 82 serve to bias the bases of transistors 73 and 74 slightly above ground in the absence of any pulses from the multivibrator or comparator circuits. Thus, a chopping pulse is produced at terminal 77. The leading edge of this chopping pulse is determined by the leading edge of a pulse from the multivibrator, and the trailing edge is determined by the leading edge of the pulse from the comparator circuit.

Pulses from terminal 77 of the flip-flop circuit energize the switch driver circuit 13 which controls the power switch 2. The driver circuit includes a transistor 84, having its base responsive to the pulses from the flip-flop circuit and which turns off the transistor causing a sharp voltage rise at the terminal between resistors 85 and 86 coupled between the transistor emitter and $+E_1$. This increases voltage at the base of transistor 87 which decreases conduction of transistor 87, and the voltage at terminal 89 decreases causing transistor 91 to conduct. When transistor 91 conducts, diode 92 is back biased, and the voltage at terminal 33 drops sharply turning on the chopper switch transistor 31.

This completes a description of one embodiment of the present invention including a switch for chopping unregulated D.C. voltage, a filter for averaging the chopping frequency, and circuits for varying the duty cycle of the chopping to compensate for ripple or fluctuations in the unregulated D.C. These circuits include a feedback circuit originating at the output of the switch for controlling the interval of the chopping, and more particularly to circuits for integrating switch output and comparing the result with a reference signal. It is to be understood, however, that these circuits are shown only by way of example to illustrate an embodiment of the invention, wherein chopping rate or duty cycle is controlled by feedback derived from the output of the switch to substantially eliminate ripple from the unregulated source, and other circuits than those shown could be substituted without deviating from the spirit and scope of the invention as set forth in the accompanying claims.

What is claimed is:

1. A system for eliminating ripple in a voltage supplied from a source to a load comprising:
   switching means between said source and load for periodically interrupting said voltage;
   means between said switching means and load for smoothing the voltage output of said switching means; generating means responsive to said smoothed voltage output for providing a reference signal;
   means for generating pulses;
   a bistable device responsive to said pulses;
   means coupling an output of said bistable device to said switching means for controlling said switching means;
   and a feedback circuit connected to the output of said switching means and to said bistable device including means for integrating the output of said switching means and detecting when the magnitude of said integrated output exceeds the magnitude of said reference signal, then producing a signal for controlling the interval of pulses applied to said switching means by changing the state of said bistable device.

2. A system for eliminating ripple in a voltage supplied from a source to a load comprising:
   switching means between said source and said load for periodically interrupting said voltage;
   means between said switching means and load for smoothing the voltage output of said switch; generating means responsive to said smoothed voltage output for providing a reference signal;
   means for generating pulses;
   a bistable device responsive to said pulses;
   means coupling the output of one stage of said bistable device to said switching means for controlling said switching means;
   and a feedback circuit between the output of said switching means and the other stage of said bistable device including means for integrating the output of said switching means and detecting when the magnitude of said integrated output exceeds the magnitude of said reference signal, then producing a signal for controlling the interval of pulses applied to said switching means by changing the state of said bistable device.

3. A system for eliminating ripple in a voltage supplied from a source to a load comprising:
   switching means between said source and said load for periodically interrupting said voltage;
   means between said switching means and load for smoothing the voltage output of said switch; generating means responsive to said smoothed voltage output for providing a reference signal;
   a free-running multivibrator generating pulses at a substantially constant repetition rate;
   a bistable multivibrator coupled to the output of said free-running multivibrator;
   means coupling the output of one stage of said bistable multivibrator to said switching means for controlling said switching means;
   and a feedback circuit from between the output of said switching means and the other stage of said bistable multivibrator including means for integrating the output of said switching means and detecting when the magnitude of said integrated output exceeds the magnitude of said reference signal, then producing a signal for resetting said bistable multivibrator, thereby controlling the interval of pulses applied to said switching means.

References Cited by the Examiner
UNITED STATES PATENTS

| | | | |
|---|---|---|---|
| 265,783 | 10/1882 | Edison | 307—96 |
| 2,821,702 | 1/1958 | Russell | 324—79 |
| 2,957,119 | 10/1960 | Carlson | 323—22 |
| 2,959,725 | 11/1960 | Younkin | 321—45 |
| 3,092,780 | 6/1963 | Fisher | 329—136 |
| 3,099,800 | 7/1963 | Vinson et al. | 324—79 |
| 3,178,617 | 4/1965 | Coker | 323—22 |

LLOYD McCOLLUM, *Primary Examiner.*
A. D. PELLINEN, D. L. RAE, *Assistant Examiners.*